(No Model.)

N. J. GOVER.
CULTIVATOR.

No. 245,812.  Patented Aug. 16, 1881.

Attest:
R. J. Barnes.
L. W. Seely.

Inventor:
Nathaniel J. Gover,
by Ellis Spear
Atty

UNITED STATES PATENT OFFICE.

NATHANIEL J. GOVER, OF OREGON, MARYLAND.

CULTIVATOR.

SPECIFICATION forming part of Letters Patent No. 245,812, dated August 16, 1881.

Application filed July 30, 1880. (No model.)

*To all whom it may concern:*

Be it known that I, NATHANIEL J. GOVER, of Oregon, Baltimore county, State of Maryland, have invented a new and useful Improvement in Cultivators; and I do hereby declare that the following is a full, clear, and exact description of the same.

My invention relates to an improvement in cultivators; and it consists in combining with a central plow-beam and parallel side beams an angular-shaped cross-bar and adjustable braces, whereby the position of the plow-beams with relation to each other may be changed, all as fully hereinafter described.

Figure 1:
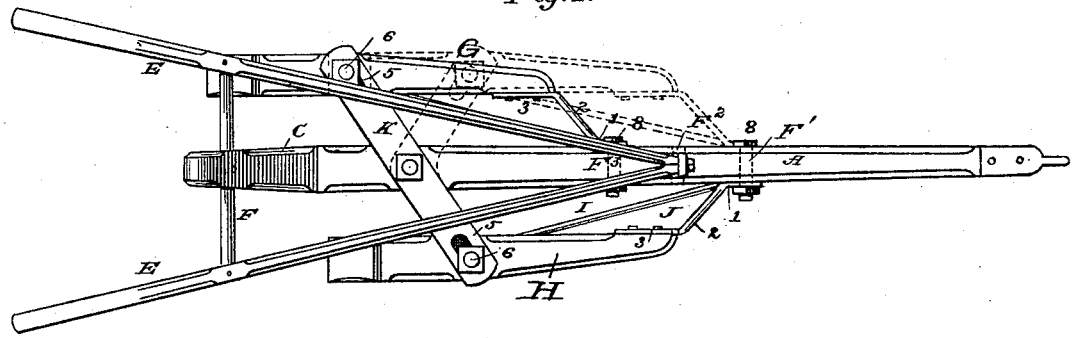
Figure 2:
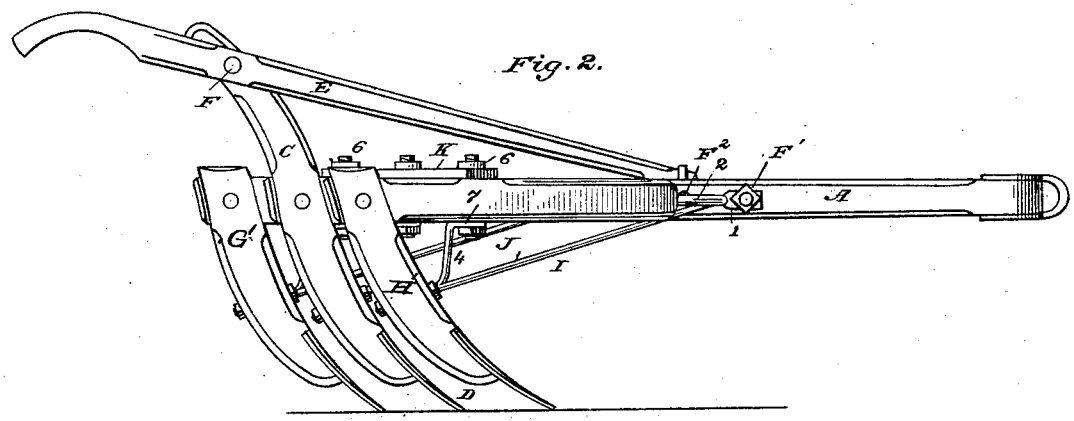
Figure 3:
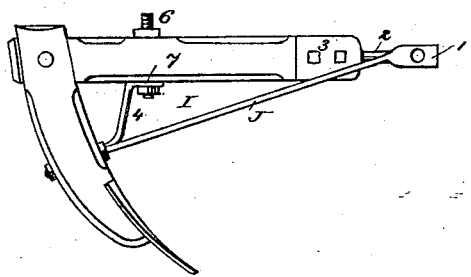

In the accompanying drawings, Figure 1 represents a top view, showing the use of a straight cross bar or yoke, which may be substituted for the angular bar (shown in dotted lines) forming the subject of my invention. Fig. 2 is a side elevation. Fig. 3 is a detail view of one of the side beams, and Fig. 4 is a plan of my improved adjustable connecting-bar.

A represents the main or central plow-beam, having a clevis at one end, and at the other a standard, C, to which is attached a shovel-plow, D, of any convenient construction. The handles E E are secured to the beam A near the center, and a cross-bar, F, rigidly attaches such handles to the standard C and holds them in position. A series of holes, F' F² F³, are made in the beam A, extending entirely through the same from side to side near the middle of such beam.

G H represent side beams, having standards G' H', to which the shovels are attached. Each of these beams is provided with a brace, I, consisting of a straight rod, J, having a plate, 1, at its end, an arm, 2, having plate 3, and an arm, 4. The plate 3 is rigidly bolted to the inside forward end of one of the side beams, and the plate 1, which is provided with an opening, is brought in line with one of the openings in the beam A and the bolt passed through. The construction of these braces is the same for each side beam.

Figure 4:
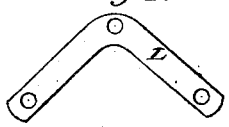

L represents a coupling-bar of angular form, as shown in Fig. 4, which is attached to the main beam just forward of the standard C. The outer ends of the coupling-bar are bolted to the side beams by bolts 6, Figs. 2 and 3, and it is evident that thereby the side beams may be advanced to a position forward of the main beam, or by reversing the position of the bar L the side beams are placed in rear of the main beam and parallel with one another.

Should it be desired to use the device as a single-shovel plow, the connecting-bolts between the side and main beams and the coupling-bar L are removed and the side beams detached.

Either side beam may be detached separately, leaving the device to operate as a single-shovel plow.

If desired, a straight coupling-bar, K, may be used, in which case one side beam may be advanced and one set back, and Fig. 1 illustrates this position.

Having thus described my invention, what I claim is—

The combination, in a cultivator, of the main beam A, side beams, G H, connecting-brace I, and the angular-shaped coupling-bar L, pivoted to the main beam and bolted to the side beams, as set forth.

In testimony whereof I have signed my name to this specification in the presence of two subscribing witnesses.

NATHANIEL JEFFERSON GOVER.

Witnesses:
L. W. SEELY,
BENNETT S. JONES.